(12) United States Patent  
Iemura et al.

(10) Patent No.: US 9,008,521 B2  
(45) Date of Patent: Apr. 14, 2015

(54) OPTICAL RECEIVER

(71) Applicant: OCLARO Japan, Inc., Kanagawa (JP)

(72) Inventors: Koki Iemura, Sagamihara (JP); Takuma Ban, Kamakura (JP); Hideharu Mikami, Kawasaki (JP); Kentaro Osawa, Kokunbunji (JP)

(73) Assignee: Oclaro Japan, Inc, Kanagawa (JP)

( * ) Notice: Subject to any disclaimer, the term of this patent is extended or adjusted under 35 U.S.C. 154(b) by 98 days.

(21) Appl. No.: 13/938,472

(22) Filed: Jul. 10, 2013

(65) Prior Publication Data  
US 2014/0016948 A1 Jan. 16, 2014

(30) Foreign Application Priority Data  
Jul. 11, 2012 (JP) ................................. 2012-155444

(51) Int. Cl.  
H04B 10/00 (2013.01)  
H04B 10/60 (2013.01)  
H04B 10/67 (2013.01)  
G02B 6/42 (2006.01)

(52) U.S. Cl.  
CPC .............. H04B 10/60 (2013.01); H04B 10/677 (2013.01); G02B 6/4214 (2013.01)

(58) Field of Classification Search  
USPC .................................. 398/202–214; 359/634  
See application file for complete search history.

(56) References Cited

U.S. PATENT DOCUMENTS

| | | | |
|---|---|---|---|
| 5,583,636 A * | 12/1996 | Bulow | 359/245 |
| 6,369,951 B1 * | 4/2002 | Spanner | 359/629 |
| 7,613,403 B2 * | 11/2009 | Hironishi et al. | 398/205 |
| 8,160,458 B2 * | 4/2012 | Tanimoto et al. | 398/212 |
| 2006/0222377 A1 * | 10/2006 | Hoshida et al. | 398/212 |
| 2007/0140695 A1 | 6/2007 | Suzuki et al. | |
| 2007/0264029 A1 * | 11/2007 | Suzuki et al. | 398/188 |
| 2008/0002987 A1 * | 1/2008 | Tian et al. | 398/161 |
| 2008/0218836 A1 * | 9/2008 | Suzuki et al. | 359/238 |
| 2008/0240736 A1 * | 10/2008 | Ji et al. | 398/202 |
| 2008/0267638 A1 * | 10/2008 | Nakashima et al. | 398/208 |
| 2009/0059351 A1 * | 3/2009 | Xu et al. | 359/325 |
| 2009/0303492 A1 | 12/2009 | Asano et al. | |
| 2009/0304394 A1 | 12/2009 | Asano et al. | |
| 2010/0158542 A1 * | 6/2010 | Steffan et al. | 398/212 |
| 2010/0329667 A1 * | 12/2010 | Mikami | 398/9 |
| 2011/0170171 A1 * | 7/2011 | McCallion et al. | 359/325 |
| 2011/0188850 A1 * | 8/2011 | Mikami et al. | 398/25 |
| 2011/0217048 A1 * | 9/2011 | Shimizu et al. | 398/202 |
| 2011/0249976 A1 * | 10/2011 | Osawa et al. | 398/135 |
| 2012/0008951 A1 * | 1/2012 | Mikami | 398/65 |
| 2012/0039618 A1 * | 2/2012 | Mamyshev et al. | 398/208 |

FOREIGN PATENT DOCUMENTS

| | | | |
|---|---|---|---|
| JP | 2007-151026 A | 6/2007 |
| JP | 2009-300539 A | 12/2009 |
| JP | 2009-300540 A | 12/2009 |

* cited by examiner

*Primary Examiner* — Agustin Bello  
(74) *Attorney, Agent, or Firm* — Mattingly & Malur, P.C.

(57) ABSTRACT

Provided is an optical receiver including a first delay interferometer, a second delay interferometer, and an input light splitting portion for inputting modulated light. The first delay interferometer includes a first light splitting portion for splitting the input light into first light and second light, a first reflecting portion and a second reflecting portion for causing the first light and the second light to return to the first light splitting portion. The second delay interferometer includes a second light splitting portion for splitting the input light into third light and fourth light, a third reflecting portion and a fourth reflecting portion for causing the third light and the fourth light to return to the second light splitting portion. A region between the first light splitting portion and the second reflecting portion intersects with a region between the second light splitting portion and the fourth reflecting portion.

15 Claims, 5 Drawing Sheets

OPTICAL RECEIVER

CROSS-REFERENCE TO RELATED APPLICATION

The present application claims priority from Japanese application JP2012-155444 filed on Jul. 11, 2012, the content of which is hereby incorporated by reference into this application.

BACKGROUND OF THE INVENTION

1. Field of the Invention

The present invention relates to an optical receiver that receives, with interferometers categorized as the space optical system, modulated light that has been modulated by a modulation method such as a differential quadrature phase shift keying system.

2. Description of the Related Art

In recent years, in order to meet the demand for increase in capacity and distance in an optical transmission system, a phase modulation system has been put into practice. For example, differential phase shift keying (hereinafter referred to as DPSK), differential quadrature phase shift keying (hereinafter referred to as DQPSK), etc. are used for the optical transmission system. Further, development has been made of a technology that uses interferometers categorized as the space optical system in a demodulator for demodulating an optical signal that has been modulated by one of those methods.

Japanese Patent Application Laid-open Nos. 2007-151026, 2009-300539, and 2009-300540 each disclose an optical receiver for demodulation of DQPSK modulated light, which uses two Michelson interferometers. The two Michelson interferometers share a prism for reflecting light. The first interferometer uses the inner side of the prism to reflect the light back, and the second interferometer uses the outer side of the prism to reflect the light back.

When the space optical system is used, there is a problem of difficulty in downsizing. For example, in technologies disclosed in Japanese Patent Application Laid-open Nos. 2007-151026, 2009-300539, and 2009-300540, not only the shared prism is upsized, but a member for optical path length adjustment needs to be specially provided in order to control a so-called skew. Thus, the downsizing is hindered. In this case, the member for optical path length adjustment is a member for adjusting optical path lengths of four light beams to be input to light receiving elements so that the four light beams have equal optical path lengths from the first element that splits the input light toward the two interferometers to the light receiving elements. Further, in the optical receivers disclosed in Japanese Patent Application Laid-open Nos. 2007-151026, 2009-300539, and 2009-300540, a problem of difficulty in characteristic control also arises. The optical receiver uses two interferometers having an asymmetric shape, that is, the interferometer on the inner side of the prism and the interferometer on the outer side of the prism. Because of this asymmetric property, even when an attempt is made to control the optical phase with use of the thermo-optic effect of a phase adjusting member, the optical path lengths of light beams traveling through the two interferometers become unequal to each other due to heat unevenness. Further, the degree of influence of substrate strain due to the heat differs between the two interferometers. Therefore, in the optical receivers disclosed in Japanese Patent Application Laid-open Nos. 2007-151026, 2009-300539, and 2009-300540, it is difficult to prevent cross-talks, signal loss, and fluctuations in polarization characteristics.

SUMMARY OF THE INVENTION

The present invention has been made in view of the above-mentioned problems, and has an object to downsize an optical receiver that demodulates, with use of two interferometers categorized as the space optical system, light modulated by DQPSK or the like.

In order to solve the above-mentioned problems, an optical receiver according to one embodiment of the present invention includes: a first delay interferometer; a second delay interferometer; and an input light splitting portion for splitting modulated light input from outside into light that enters the first delay interferometer and light that enters the second delay interferometer. The first delay interferometer includes: a first light splitting portion for splitting the light that enters the first delay interferometer into first light and second light; a first reflecting portion for reflecting the first light toward the first light splitting portion; and a second reflecting portion for reflecting the second light toward the first light splitting portion. The second delay interferometer includes: a second light splitting portion for splitting the light that enters the second delay interferometer into third light and fourth light; a third reflecting portion for reflecting the third light toward the second light splitting portion; and a fourth reflecting portion for reflecting the fourth light toward the second light splitting portion. A region between the first light splitting portion and the second reflecting portion intersects with a region between the second light splitting portion and the fourth reflecting portion.

Further, in the one embodiment of the present invention, a distance between the first reflecting portion and the first light splitting portion may be shorter than a distance between the second reflecting portion and the first light splitting portion. A distance between the third reflecting portion and the second light splitting portion may be shorter than a distance between the fourth reflecting portion and the second light splitting portion.

Further, in the one embodiment of the present invention, an optical path length of the first light that is output from the first light splitting portion and passes through the first reflecting portion to return to the first light splitting portion may be shorter than an optical path length of the second light that is output from the first light splitting portion and passes through the second reflecting portion to return to the first light splitting portion by an amount corresponding to one symbol. An optical path length of the third light that is output from the second light splitting portion and passes through the third reflecting portion to return to the second light splitting portion may be shorter than an optical path length of the fourth light that is output from the second light splitting portion and passes through the fourth reflecting portion to return to the second light splitting portion by an amount corresponding to one symbol.

Further, in the one embodiment of the present invention, the input light splitting portion, the first light splitting portion, and the second light splitting portion may each be a half beam splitter. The input light splitting portion may be located between the second light splitting portion and an optical path of light that is reflected by the first reflecting portion and travels straight through the first light splitting portion, and between the first light splitting portion and an optical path of light that is reflected by the third reflecting portion and travels straight through the second light splitting portion.

Further, in the one embodiment of the present invention, the optical receiver may further include an input light reflective mirror for reflecting the modulated light input from an optical fiber toward the input light splitting portion. An optical path of the modulated light input from the optical fiber and an optical path of light reflected by the input light reflective mirror may form an angle of 43° to 47°.

Further, in the one embodiment of the present invention, the optical receiver may further include a first interference light reflecting portion, a second interference light reflecting portion, a third interference light reflecting portion, and a fourth interference light reflecting portion. The first light splitting portion may output first interference light and second interference light based on the first light that is reflected by the first reflecting portion to enter the first light splitting portion and the second light that is reflected by the second reflecting portion to enter the first light splitting portion. The second light splitting portion may output third interference light and fourth interference light based on the third light that is reflected by the third reflecting portion to enter the second light splitting portion and the fourth light that is reflected by the fourth reflecting portion to enter the second light splitting portion. The first interference light reflecting portion, the second interference light reflecting portion, the third interference light reflecting portion, and the fourth interference light reflecting portion may reflect the first interference light, the second interference light, the third interference light, and the fourth interference light, respectively.

Further, in the one embodiment of the present invention, an optical path of the second interference light from the first light splitting portion to the second interference light reflecting portion may intersect with an optical path of the third interference light from the second light splitting portion to the third interference light reflecting portion.

Further, in the one embodiment of the present invention, the first interference light reflecting portion, the second interference light reflecting portion, the third interference light reflecting portion, and the fourth interference light reflecting portion may each have a trapezoidal shape in section. The first interference light reflecting portion, the second interference light reflecting portion, the third interference light reflecting portion, and the fourth interference light reflecting portion may be arranged so that the first interference light, the second interference light, the third interference light, and the fourth interference light each enter a surface including one of non-parallel opposite sides of the trapezoidal shape and are each reflected by a surface including a longer side of parallel opposite sides of the trapezoidal shape.

Further, in the one embodiment of the present invention, the optical receiver may further include: a first light receiving portion for receiving the first interference light reflected by the first interference light reflecting portion and the second interference light reflected by the second interference light reflecting portion; and a second light receiving portion for receiving the third interference light reflected by the third interference light reflecting portion and the fourth interference light reflected by the fourth interference light reflecting portion. The first light splitting portion may be present on a bisector of an angle between an optical path of the first interference light reflected by the first interference light reflecting portion and an optical path of the second interference light reflected by the second interference light reflecting portion. The second light splitting portion may be present on a bisector of an angle between an optical path of the third interference light reflected by the third interference light reflecting portion and an optical path of the fourth interference light reflected by the fourth interference light reflecting portion.

Further, in the one embodiment of the present invention, the optical receiver may further include: a main substrate onto which the input light splitting portion, the first delay interferometer, and the second delay interferometer are mounted; and a case configured to house the main substrate.

Further, in the one embodiment of the present invention, the input light splitting portion, the first light splitting portion, and the second light splitting portion may each be a half beam splitter.

Further, in the one embodiment of the present invention, the half beam splitter may have a splitting film surface that is substantially parallel to a longitudinal side of the case.

Further, in the one embodiment of the present invention, the half beam splitter may have a reflecting and splitting surface that is tilted by 1° to 8° with respect to a longitudinal side of the case.

Further, in the one embodiment of the present invention, the main substrate may have a longitudinal side that is substantially parallel to a longitudinal side of the case.

Further, in the one embodiment of the present invention, the modulated light and the splitting film surface of the half beam splitter as the input light splitting portion may form an angle of one of 37° to 44° and 46° to 53°.

According to the present invention, it is possible to downsize the optical receiver that demodulates, with the use of the two interferometers categorized as the space optical system, the light modulated by DQPSK or the like.

DETAILED DESCRIPTION OF THE INVENTION

Figure 1:
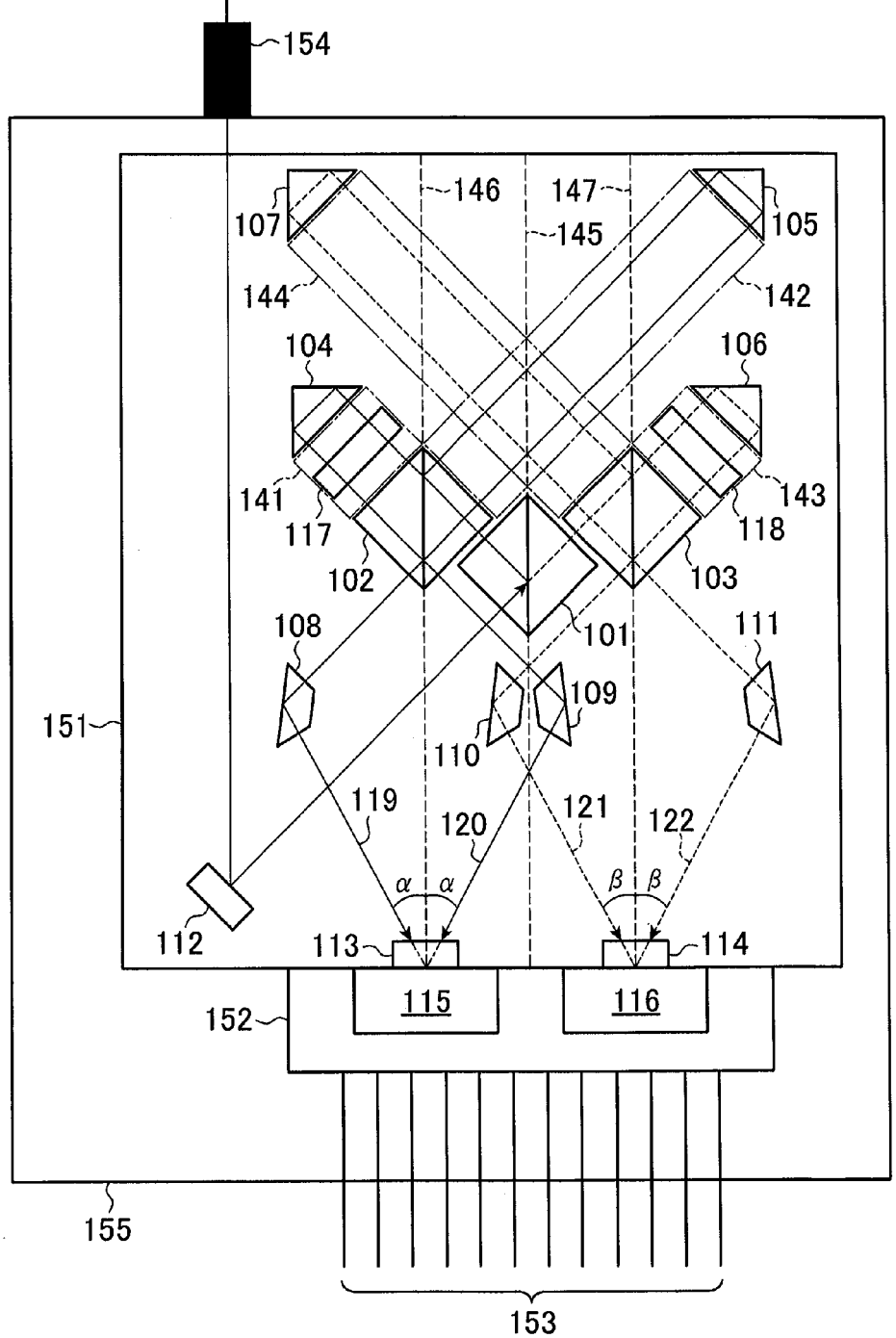
FIG. 1 is a plan view illustrating an example of a configuration of an optical receiver according to a first embodiment of the present invention.

Now, embodiments of the present invention are described with reference to the drawings. Of the appearing components, ones having the same functions are denoted by the same reference characters, and description thereof is omitted.

First Embodiment

FIG. 1 is a plan view illustrating an example of a configuration of an optical receiver according to a first embodiment of the present invention. This optical receiver demodulates an optical signal that has been modulated by DQPSK. The optical receiver includes a main substrate 151, a sub-substrate 152, an electrode 153 for signal current output, and a case 155 to which the main substrate 151 and the sub-substrate 152 are fixed. The case 155 has a cuboid shape, and the bottom surface and the upper surface thereof are the widest surfaces of the surfaces forming the cuboid shape. The main substrate 151 is fixed to the inner side of the case 155 along the bottom surface thereof. Further, an optical fiber 154 with a collimator, for inputting modulated light to the optical receiver, is connected to one side surface of the four side surfaces provided with respect to the bottom surface. The optical fiber 154 with the collimator inputs the modulated light that has been modulated by DQPSK with an optical transmitter as input light of the optical receiver in a direction perpendicular to the one side surface.

The main substrate 151 has a rectangular shape in plan view, and is fixed along the bottom surface of the case 155. In plan view, the lateral direction of the main substrate 151 is parallel to the side surface of the case 155, to which the optical fiber 154 with the collimator is connected. On the main substrate 151, there are arranged a first interferometer, a second interferometer, an optical circuit for inputting light into those two interferometers, a first light receiving portion 113, a second light receiving portion 114, and an optical circuit for causing interference light beams output from the two interferometers to enter the first light receiving portion 113 and the second light receiving portion 114. The first and second interferometers are each a delay interferometer, specifically, a so-called Michelson interferometer. Note that, those optical elements may be arranged directly on the case 155, but the assembly operation is more facilitated when the optical elements are arranged on the main substrate 151 and then assembled to the case 155. Further, the longitudinal side of the main substrate 151 and the longitudinal side of the case 155 are arranged substantially parallel to each other, and thus the assembly operation can be facilitated. In this case, "substantially parallel" includes a range in which the two sides become parallel to each other when being moved within a range of manufacturing error.

The sub-substrate 152 has high-frequency parts mounted thereon, such as a first amplifier 115 and a second amplifier 116. Note that, the design of the high-frequency line and the mounting method to the case 155 may be changed so that the high-frequency parts are arranged onto the main substrate 151.

Now, the optical elements mounted onto the main substrate 151 are described. For the sake of convenience, description is made assuming that the side surface of the case, to which the optical fiber 154 with the collimator is connected, is provided on the upper side.

The optical elements forming the optical circuit for inputting light into the two interferometers are an input light splitting portion 101 and an input light reflective mirror 112. The input light from the optical fiber 154 with the collimator is input to the input light splitting portion 101 by the input light reflective mirror 112. The input light splitting portion 101 is specifically a half beam splitter, and has a cuboid shape obtained by combining two right angle prisms. An interface of the two prisms is called a splitting film surface. The half beam splitter splits light that enters the splitting film surface at about 45° (considering the range in which the half beam splitter functions generally, 43° to) 47° into light that travels straight in the entering direction and light that is reflected substantially at a right angle. The input light reflective mirror 112 is, for example, a metal film mirror, and reflects the input light toward the input light splitting portion 101. The input light reflective mirror 112 is arranged at a position and an angle that enable the input light splitting portion 101 to split the reflected light into two light beams. In the example of FIG. 1, the input light is reflected in a direction tilted to the right by 45° with respect to a direction from the lower side to the upper side. With this, an angle between the optical path of the input light from the optical fiber 154 with the collimator and the optical path of the reflected light becomes 45°. Note that, the direction of the input light from the optical fiber 154 with the collimator may be a direction from the lower side to the upper side. In this case, the arrangement of the input light reflective mirror 112 is changed as appropriate in accordance with such condition. The splitting film surface of the input light splitting portion 101 is parallel to the longitudinal direction of the main substrate 151. The input light reflected by the input light reflective mirror 112 is input to the input light splitting portion 101. The input light splitting portion 101 splits the input light that has been input into two light beams, and the two light beams are input to the first interferometer and the second interferometer, respectively. The two light beams are a light beam that is transmitted through the splitting film surface to travel in the upper right direction, and a light beam that is reflected by the splitting film surface to travel in the upper left direction. Note that, the optical path of light that travels between optical elements mounted on the main substrate 151 is on a plane taken along the main substrate 151.

The optical elements forming the first interferometer are a first light splitting portion 102, a first reflecting portion 104, a second reflecting portion 105, and a first phase adjusting circuit 117, and the optical elements forming the second interferometer are a second light splitting portion 103, a third reflecting portion 106, a fourth reflecting portion 107, and a second phase adjusting circuit 118. The first light splitting portion 102 and the second light splitting portion 103 are each a half beam splitter similarly to the input light splitting portion 101. The reflecting surfaces of the first light splitting portion 102 and the second light splitting portion 103 are parallel to the longitudinal direction of the main substrate 151. Further, the first reflecting portion 104, the second reflecting portion 105, the third reflecting portion 106, and the fourth reflecting portion 107 are each a right angle prism, and are each arranged so that an optical path of the reflected light is translated on the lower side with respect to the incident light. The incident light enters a surface corresponding to a hypotenuse of a right triangle in section and is reflected The first phase adjusting circuit 117 and the second phase adjusting circuit 118 are each a circuit for adjusting the optical path length of light passing therethrough with use of a thermo-optic effect, for example. In this case, the first interferometer and the second interferometer are arranged so as to achieve symmetry of reflection with a line of symmetry 145 as an axis, the line of symmetry 145 passing through substantially the center of the input light splitting portion 101 and extending in the longitudinal direction.

The light input to the first interferometer enters the first light splitting portion 102 provided on the upper left side of the input light splitting portion 101. The first light splitting portion 102 splits the light input thereto into first light that travels in the upper left direction and second light that travels in the upper right direction. In this case, the input light splitting portion 101, the first light splitting portion 102, and the first reflecting portion 104 are arrayed in order in the upper left direction. The first reflecting portion 104 reflects the first light toward the first light splitting portion 102, and the second reflecting portion 105 reflects the second light toward the first light splitting portion 102. The first reflecting portion 104 and the second reflecting portion 105 are arranged so that the first light reflected by the first reflecting portion 104 and the second light reflected by the second reflecting portion 105 intersect with each other on the reflecting surface of the first light splitting portion 102. The first light splitting portion 102 outputs, from the point at which the first light and the second light intersect with each other, first interference light 119 that travels toward the lower left side and second interference light 120 that travels toward the lower right side. Further, the first phase adjusting circuit 117 is placed between the first light splitting portion 102 and the first reflecting portion 104, and adjusts the phase by changing the optical path length between the light from the first light splitting portion 102 and the light from the first reflecting portion 104. Note that, the first phase adjusting circuit 117 may be placed between the first light splitting portion 102 and the second reflecting portion 105.

The light input to the second interferometer enters the second light splitting portion 103 provided on the upper right side of the input light splitting portion 101. The second light splitting portion 103 splits the light input thereto into third light that travels in the upper right direction and fourth light that travels in the upper left direction. In this case, the input light splitting portion 101, the second light splitting portion 103, and the third reflecting portion 106 are arrayed in order in the upper right direction. The third reflecting portion 106 reflects the third light toward the second light splitting portion 103, and the fourth reflecting portion 107 reflects the fourth light toward the second light splitting portion 103. The third reflecting portion 106 and the fourth reflecting portion 107 are arranged so that the third light reflected by the third reflecting portion 106 and the fourth light reflected by the fourth reflecting portion 107 intersect with each other on the reflecting surface of the second light splitting portion 103. The second light splitting portion 103 outputs, from the point at which the third light and the fourth light intersect with each other, third interference light 121 that travels toward the lower left side and fourth interference light 122 that travels toward the lower right side. Further, the second phase adjusting circuit 118 is placed between the second light splitting portion 103 and the third reflecting portion 106, and adjusts the phase by changing the optical path length between the light from the second light splitting portion 103 and the light from the third reflecting portion 106. Note that, the second phase adjusting circuit 118 may be placed between the second light splitting portion 103 and the fourth reflecting portion 107.

The optical path length of the first light that is output from the first light splitting portion 102 and passes through the first reflecting portion 104 to return to the first light splitting portion 102 is represented by L1, and the optical path length of the second light that is output from the first light splitting portion 102 and passes through the second reflecting portion 105 to return to the first light splitting portion 102 is represented by L2. In this case, the optical path difference (L2−L1) is an amount that corresponds to substantially one symbol in communication. In DQPSK, one symbol corresponds to a time period for each of two types of light to send one bit. Data is generally sent at about 20 GHz, and hence the optical path length difference in air corresponding to one symbol is about 15 mm. Note that, the optical path length difference may not be accurately equal to the amount obtained by calculation, and there may be a difference (about several wavelengths) from the calculated amount to the extent that can be adjusted by the first phase adjusting circuit 117. Further, the optical path length of the third light that is output from the second light splitting portion 103 and passes through the third reflecting portion 106 to return to the second light splitting portion 103 is represented by L3, and the optical path length of the fourth light that is output from the second light splitting portion 103 and passes through the fourth reflecting portion 107 to return to the second light splitting portion 103 is represented by L4. Also in this case, the optical path difference is similar to that described above. Note that, the optical path of each of the input light, the first to fourth light beams, and the first to fourth interference light beams 119 to 122 is on the plane that is substantially parallel to the substrate.

In this case, a region between the first light splitting portion 102 and the first reflecting portion 104 is referred to as a first region 141, a region between the first light splitting portion 102 and the second reflecting portion 105 is referred to as a second region 142, a region between the second light splitting portion 103 and the third reflecting portion 106 is referred to as a third region 143, and a region between the second light splitting portion 103 and the fourth reflecting portion 107 is referred to as a fourth region 144. In this case, the second region 142 and the fourth region 144 intersect with each other. The first region 141, the second region 142, the third region 143, and the fourth region 144 include the optical paths of the first to fourth light beams, respectively. Further, when the longitudinal (lateral) direction of the main substrate 151 is set to be non-parallel to all of the optical paths of the first to fourth light beams (it is preferred that the angle formed between each of those optical paths and the longitudinal direction be about 45°), a dead space to be generated when combining the two Michelson interferometers can be further reduced. The reason is as follows. When the region on the main substrate 151 on which the optical elements are mounted has a rectangular shape, the second region and the fourth region that need the largest length can each be extended in an oblique direction (direction closer to the diagonal line) from the vicinity of the corner of the rectangular shape.

In this case, the input light splitting portion 101, the first light splitting portion 102, the second light splitting portion 103, and the optical paths of the first to fourth light beams are adjusted so that the left end of the first reflecting portion 104 and the left end of the fourth reflecting portion 107 are located to have substantially the same distance when viewed from the left end (right end) of the case 155. Note that, the right end of the second reflecting portion 105 and the right end of the third reflecting portion 106 are similar to the above. With this adjustment, the size of the main substrate 151 can be reduced as much as possible.

The input light splitting portion 101 is located between the second light splitting portion 103 and the optical path of light that is reflected by the first reflecting portion 104 and travels straight beyond the first light splitting portion 102, specifically, the second interference light 120 from the first light splitting portion 102. Further, the input light splitting portion 101 is located between the first light splitting portion 102 and the optical path of light that is reflected by the third reflecting portion 106 and travels straight beyond the second light splitting portion 103, specifically, the third interference light 121 from the second light splitting portion 103. With this configuration, no optical path is provided between the input light splitting portion 101 and the first light splitting portion 102, or between the input light splitting portion 101 and the second light splitting portion 103. With this, the optical receiver can be further downsized.

Next, description is made of the optical circuit for causing the first to fourth interference light beams 119 to 122 to enter the first and second light receiving portions 113 and 114. The optical elements forming this optical circuit are a first mirror 108, a second mirror 109, a third mirror 110, and a fourth mirror 111.

The first to fourth mirrors 108 to 111 are arranged at the traveling destinations of the first to fourth interference light beams 119 to 122, respectively. The first mirror 108 and the second mirror 109 reflect the first interference light 119 and the second interference light 120, respectively, toward the first light receiving portion 113. The third mirror 110 and the fourth mirror 111 reflect the third interference light 121 and the fourth interference light 122, respectively, toward the second light receiving portion 114. Further, on one imaginary line extending in the lateral direction of the main substrate 151, the first mirror 108, the third mirror 110, the second mirror 109, and the fourth mirror 111 are arranged in order from the left side. The optical path of the second interference light 120 and the optical path of the third interference light 121 intersect with each other before and after the second interference light 120 and the third interference light 121 are reflected by the second mirror 109 and the third mirror 110, respectively. This is for reducing the lateral width of each of the first and second interferometers.

Assuming that a first imaginary line 146 is a bisector of an angle between the first interference light 119 reflected by the first mirror 108 and the second interference light 120 reflected by the second mirror 109, the first light splitting portion 102 is arranged on the first imaginary line 146. Further, assuming that a second imaginary line 147 is a bisector of an angle between the third interference light 121 reflected by the third mirror 110 and the fourth interference light 122 reflected by the fourth mirror 111, the second light splitting portion 103 is arranged on the second imaginary line 147. With this, between the first interference light 119 and the second interference light 120 entering the first light receiving portion 113, and between the third interference light 121 and the fourth interference light 122 entering the second light receiving portion 114, the optical path lengths substantially match with each other in terms of geometry. Therefore, even without a member dedicated for optical path adjustment, a necessary optical path difference can be obtained. This fact also contributes to downsizing through reduction of the number of components.

The first to fourth mirrors 108 to 111 each have a trapezoidal shape in a cross section taken along the bottom surface of the main substrate 151. Those mirrors are arranged so that the first to fourth interference light beams 119 to 122 each enter a surface including one of the non-parallel opposite sides of the trapezoidal shape, and are each reflected by a surface including a longer side of the parallel opposite sides of the trapezoidal shape.

Generally, as the mirror, a prism having an incident surface as a mirror surface is used. However, this type of mirror requires a space on the rear side of the incident surface, which leads to an increase in size of the main substrate 151 and the case 155 as a result. To address this problem, it is conceivable to cause light to enter inside of the prism, reflect the light at the adjacent surface, and cause the light to exit from the further adjacent surface. However, when this method is used, for example, the second mirror 109 and the third mirror 110 interfere with each other, and thus the second mirror 109 and the third mirror 110 cannot be mounted on the substrate. In this case, by using the prism having a trapezoidal section as the mirror, the interference among the optical elements and the optical paths is prevented, and thus further downsizing can be realized.

The first light receiving portion 113 and the second light receiving portion 114 are each formed of a 2-array photodiode chip. The first light receiving portion 113 outputs, as an electrical signal, the intensity difference between the first interference light 119 and the second interference light 120, and the second light receiving portion 114 outputs, as an electrical signal, the intensity difference between the third interference light 121 and the fourth interference light 122. The first amplifier 115 and the second amplifier 116 amplify the currents output from the first light receiving portion 113 and the second light receiving portion 114, respectively, and the intensity difference of the two interference light beams is output via the electrode 153 for signal current output.

Second Embodiment

A second embodiment of the present invention differs from the first embodiment mainly in the shapes of the input light splitting portion 101, the first light splitting portion 102, and the second light splitting portion 103. This difference is mainly described below.

Figure 2:
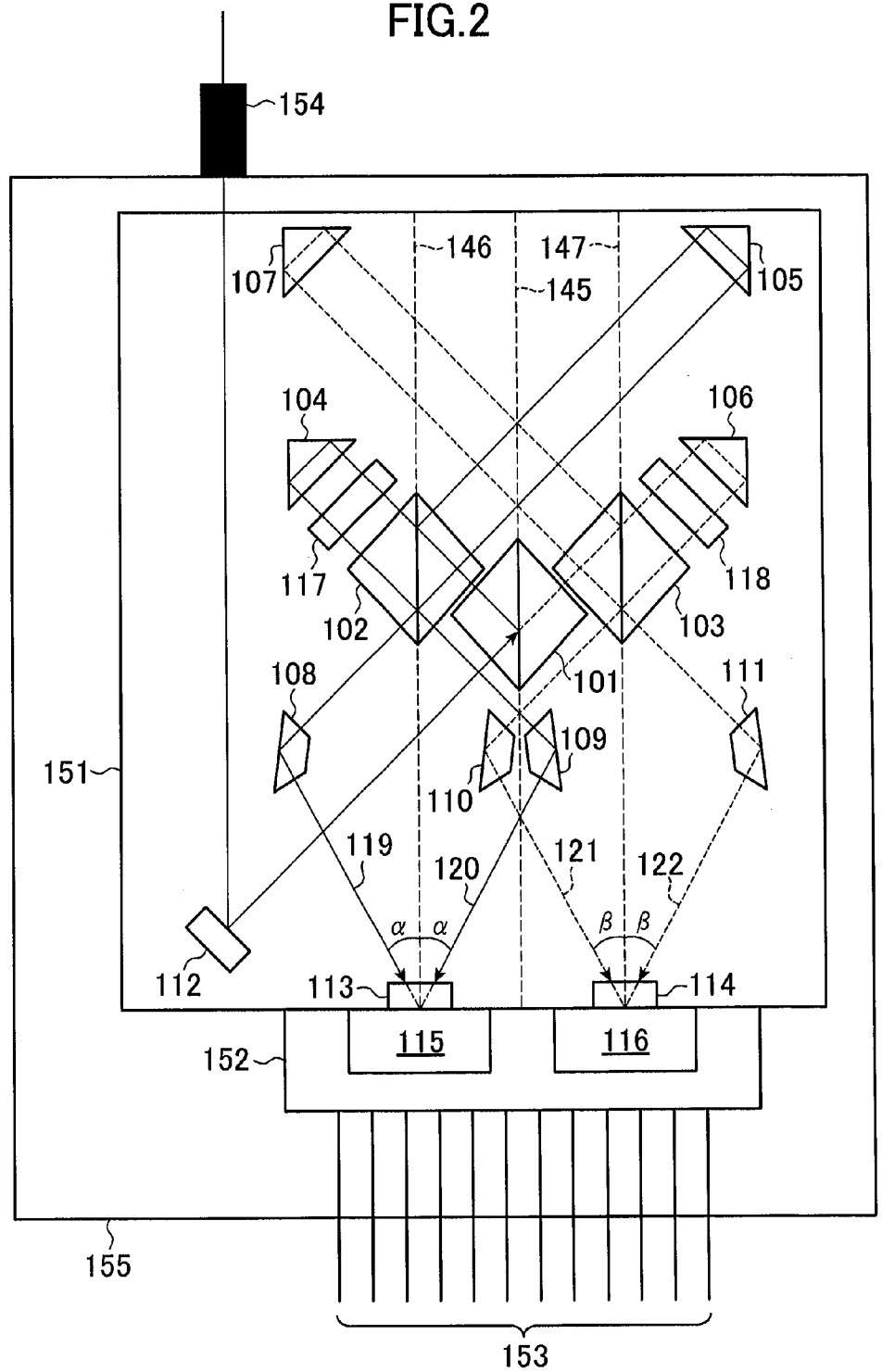
FIG. 2 is a plan view illustrating an example of a configuration of an optical receiver according to a second embodiment of the present invention.

FIG. 2 is a plan view illustrating an example of a configuration of an optical receiver according to the second embodiment of the present invention. In this embodiment, the three half beam splitters, that is, the input light splitting portion 101, the first light splitting portion 102, and the second light splitting portion 103 each have a rhombic shape in section taken along the main substrate 151. In the example of FIG. 2, a surface corresponding to the longer one of the diagonal lines of the rhombus is the splitting film surface for splitting the incident light. As described above, the half beam splitter is formed into a rhombic shape, and thus a return loss due to multi-reflection is suppressed. Further, in this embodiment, the cross sections of the above-mentioned three half beam splitters have the same shape. By forming the first light splitting portion 102 and the second light splitting portion 103 into the same shape, the two interferometers have a symmetric structure, and hence fluctuations in optical characteristics and increase in scale of the optical circuit can be prevented. In this case, generally, the angle of the rhombus on the side of the intersection between the splitting film and the prism is sharper by about 1° than other angles. The difference of about 1° does not break the total reflection condition of the half beam splitter.

Further, the arrangement of other optical elements forming the two interferometers and the like is similar to that in FIG. 1. In FIG. 2, for the sake of easy understanding of the description, the first to fourth reflecting portions 104 to 107 are each located at substantially the same position and angle as those in FIG. 1. However, in the actual case, the position and angle are adjusted in accordance with the reflection and refraction from the splitting film surface of the half beam splitter.

Third Embodiment

A third embodiment of the present invention differs from the first embodiment mainly in the directions of the input light splitting, portion 101, the first light splitting portion 102, and the second light splitting portion 103. This difference is mainly described below.

Figure 3:
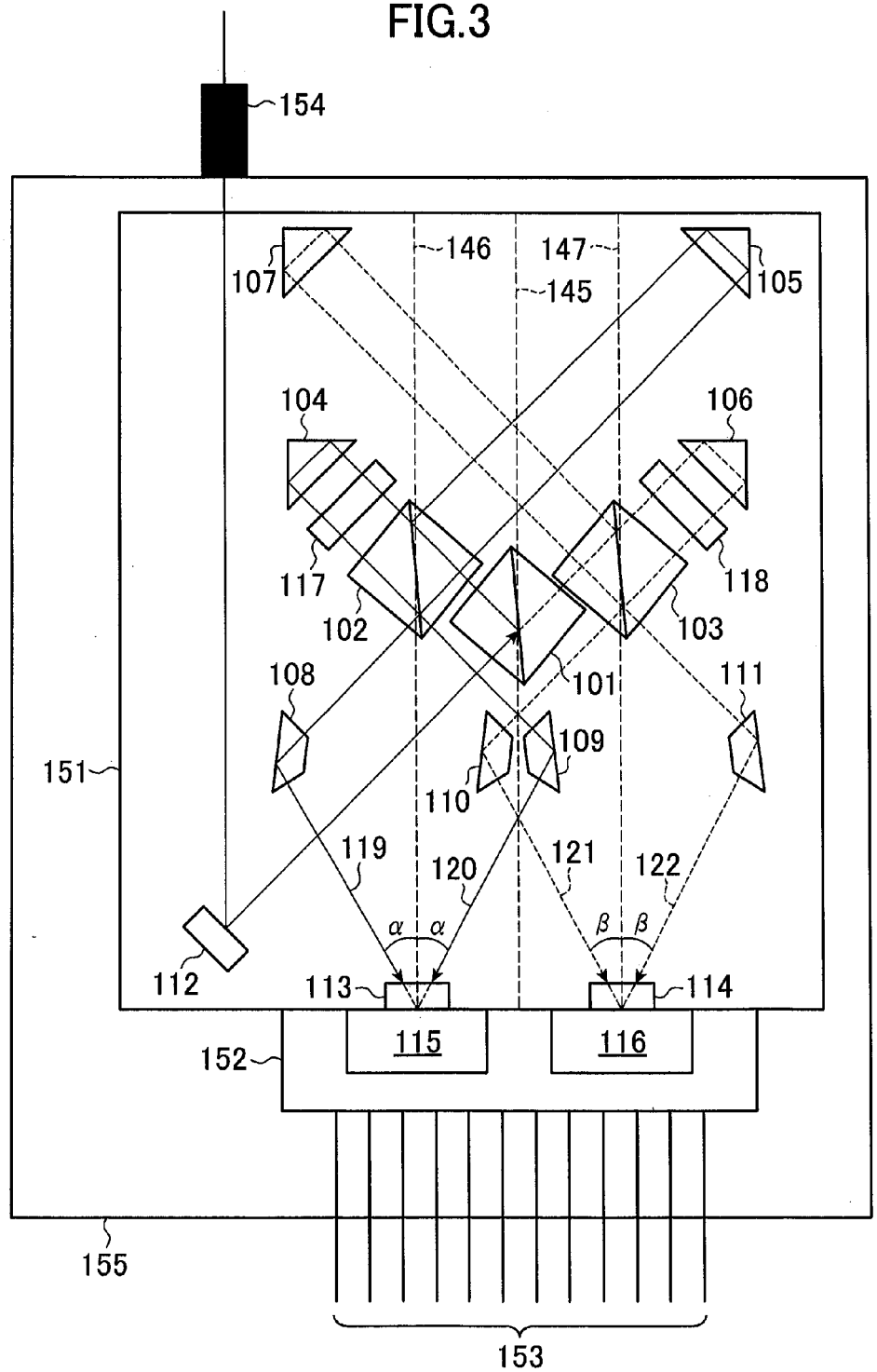
FIG. 3 is a plan view illustrating an example of a configuration of an optical receiver according to a third embodiment of the present invention.

FIG. 3 is a plan view illustrating an example of a configuration of an optical receiver according to the third embodiment of the present invention. In this embodiment, the three half beam splitters, that is, the input light splitting portion 101, the first light splitting portion 102, and the second light splitting portion 103 respectively have the splitting film surfaces that are rotated in the same direction by a predetermined angle with respect to the longitudinal direction of the case 155 and the line of symmetry 145. With this configuration, a return loss due to multi-reflection is suppressed. Generally, in order to suppress the return loss, the predetermined angle is preferred to be set to about 1° to 8°.

In this embodiment, the three half beam splitters are rotated by substantially the same angle. In this manner, the two interferometers are prevented from losing their symmetric property, and fluctuations in optical characteristics and increase in circuit scale can be prevented. Note that, the arrangement of other optical elements forming the two interferometers and the like is similar to that in FIG. 1.

In FIG. 3, for the sake of easy understanding of the description, the first to fourth reflecting portions 104 to 107 are each located at substantially the same position and angle as those in FIG. 1. However, in the actual case, the position and angle are adjusted in accordance with the reflection and refraction from the splitting film surface of the half beam splitter. Note that, when the return loss specification is strict, the shape of the half beam splitter illustrated in FIG. 2 and the rotation of the half beam splitter illustrated in FIG. 3 may be combined. Further, in this case, the half beam splitter is tilted, but alternatively, the tilting angle of the input light reflective mirror 112 may be changed from 45° to about 37° to 44° or about 46° to 53° to reduce the return loss. Even in this case, the similar effect can be obtained. In other words, when the input light reflective mirror 112 is arranged to cause reflection at an angle that is shifted from 45°, in the half beam splitter serving as the input light splitting portion 101, the input light that enters the half beam splitter is not perpendicular to the surface that the input light enters first. With this, the return loss can be reduced. This state is equivalent to a state that the input light and the splitting film surface of the half beam splitter serving as the input light splitting portion 101 form an angle of 37° to 44° or 46° to 53°.

Fourth Embodiment

A fourth embodiment of the present invention differs from the first embodiment mainly in that the first light receiving portion 113 and the second light receiving portion 114 are not provided inside the optical receiver. This difference is mainly described below.

Figure 4:
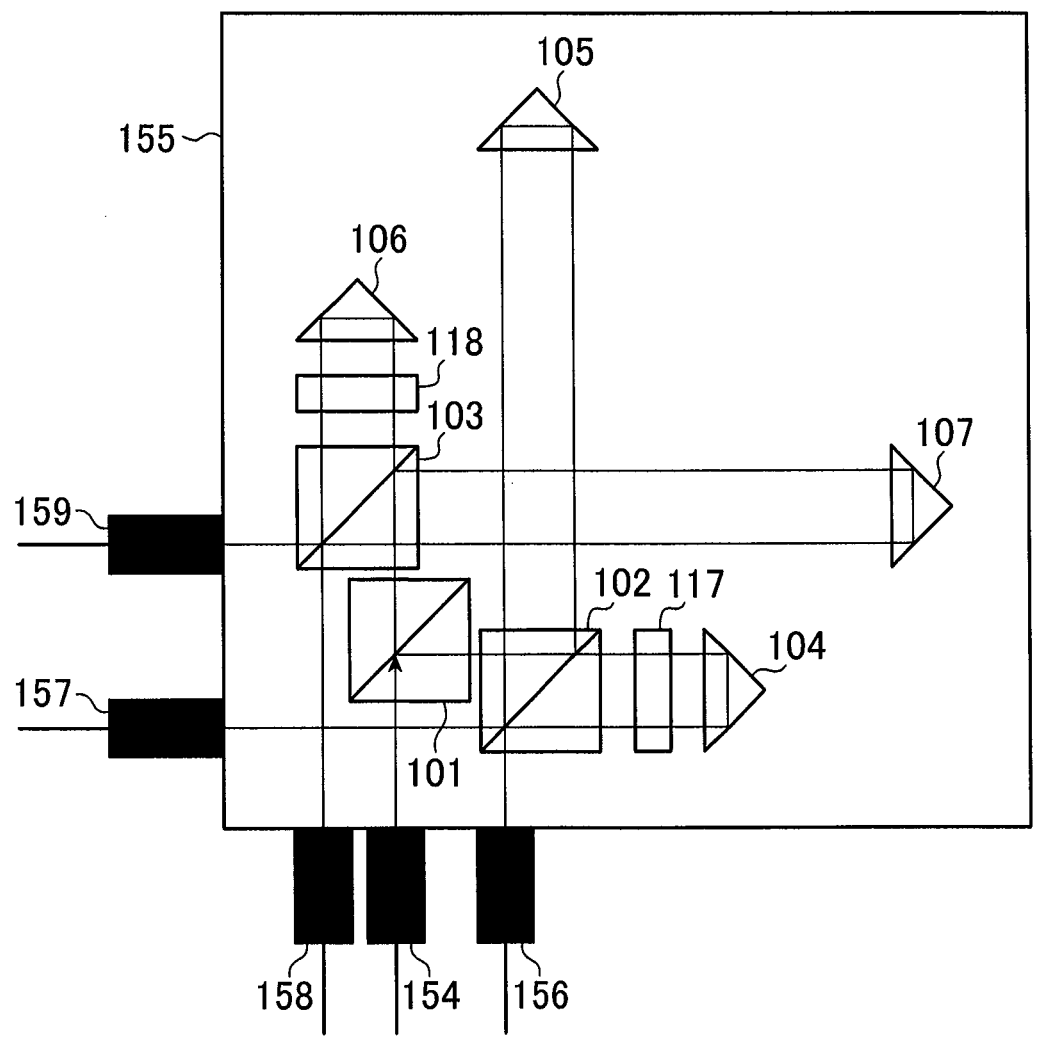
FIG. 4 is a plan view illustrating an example of a configuration of an optical receiver according to a fourth embodiment of the present invention.

FIG. 4 is a plan view illustrating an example of a configuration of an optical receiver according to the fourth embodiment of the present invention. In this embodiment, on the bottom surface of the case 155 of the optical receiver, the first interferometer, the second interferometer, and the input light splitting portion 101 are arranged. Further, on the side surfaces of the case 155, the optical fiber 154 with the collimator, a first output optical fiber 156, a second output optical fiber 157, a third output optical fiber 158, and a fourth output optical fiber 159 are connected. The first to fourth output optical fibers 156 to 159 are each an optical fiber with the collimator. The first and second interference light beams 119 and 120 output from the first light splitting portion 102 and the third and fourth interference light beams 121 and 122 output from the second light splitting portion 103 directly enter the first to fourth output optical fibers 156 to 159, respectively. Those interference light beams are transmitted toward the light receiving elements provided outside the case 155. As described above, the optical receiver may be formed merely of optical elements, and the first to fourth interference light beams 119 to 122 may be output outside the case 155 with the optical fibers with collimators. Note that, the configuration of this embodiment and the configuration of the half beam splitter of the second embodiment or the third embodiment may be combined.

Fifth Embodiment

A fifth embodiment of the present invention differs from the fourth embodiment in that the input light reflective mirror 112 reflects the input light from the optical fiber 154 with the collimator toward the input light splitting portion 101, and in that the first to fourth interference light beams 119 to 122 reflected by the first to fourth mirrors 108 to 111 are input to the first to fourth output optical fibers 156 to 159, respectively. This difference is mainly described below.

Figure 5:
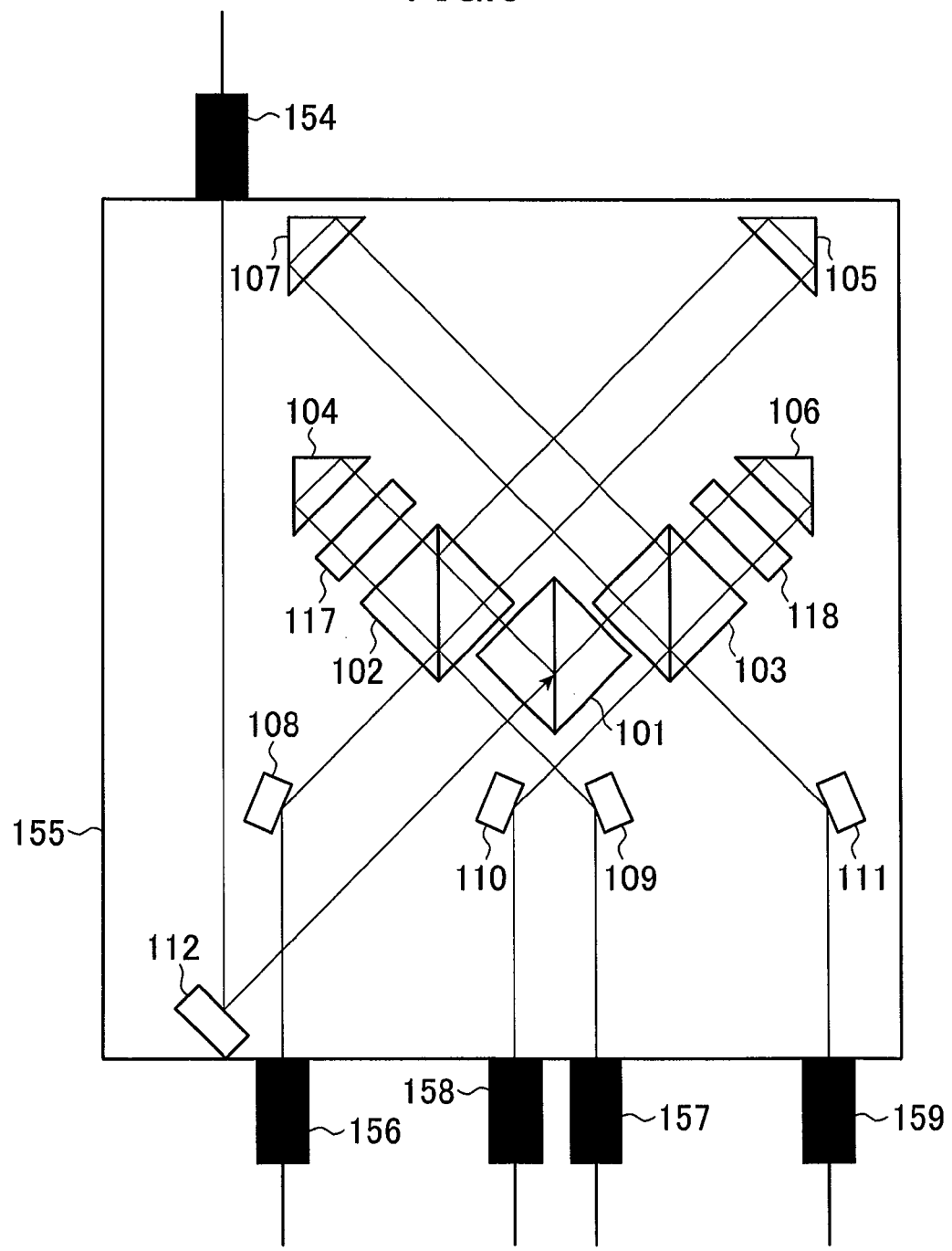
FIG. 5 is a plan view illustrating an example of a configuration of an optical receiver according to a fifth embodiment of the present invention.

FIG. 5 is a plan view illustrating an example of a configuration of an optical receiver according to the fifth embodiment of the present invention. In this embodiment, the optical paths of light beams passing through the two interferometers are not parallel or perpendicular to the side surfaces of the case 155 (specifically, the optical paths are provided in directions of about 45° with respect to the side surfaces). Further, because the first to fourth mirrors 108 to 111 are provided, the first to fourth output optical fibers 156 to 159 are connected to one side surface of the case 155. With this configuration, the extending directions of the optical fibers can be aligned, and hence the optical fibers can be easily handled. Note that, the configuration of this embodiment and the configuration of the half beam splitter of the second embodiment or the third embodiment may be combined.

While there have been described what are at present considered to be certain embodiments of the invention, it will be understood that various modifications may be made thereto, and it is intended that the appended claims cover all such modifications as fall within the true spirit and scope of the invention.

What is claimed is:

1. An optical receiver, comprising:
   a first delay interferometer;
   a second delay interferometer; and
   an input light splitting portion for splitting modulated light input from outside into light that enters the first delay interferometer and light that enters the second delay interferometer,
   wherein the first delay interferometer comprises:
      a first light splitting portion for splitting the light that enters the first delay interferometer into first light and second light;
      a first reflecting portion for reflecting the first light toward the first light splitting portion; and
      a second reflecting portion for reflecting the second light toward the first light splitting portion,
   wherein the second delay interferometer comprises:
      a second light splitting portion for splitting the light that enters the second delay interferometer into third light and fourth light;
      a third reflecting portion for reflecting the third light toward the second light splitting portion; and
      a fourth reflecting portion for reflecting the fourth light toward the second light splitting portion, and
   wherein a region between the first light splitting portion and the second reflecting portion intersects with a region between the second light splitting portion and the fourth reflecting portion.

2. The optical receiver according to claim 1,
   wherein a distance between the first reflecting portion and the first light splitting portion is shorter than a distance between the second reflecting portion and the first light splitting portion, and
   wherein a distance between the third reflecting portion and the second light splitting portion is shorter than a distance between the fourth reflecting portion and the second light splitting portion.

3. The optical receiver according to claim 2,
   wherein an optical path length of the first light that is output from the first light splitting portion and passes through the first reflecting portion to return to the first light splitting portion is shorter than an optical path length of the second light that is output from the first light splitting portion and passes through the second reflecting portion to return to the first light splitting portion by an amount corresponding to one symbol, and wherein an optical path length of the third light that is output from the second light splitting portion and passes through the third reflecting portion to return to the second light splitting portion is shorter than an optical path length of the fourth light that is output from the second light splitting portion and passes through the fourth reflecting portion to return to the second light splitting portion by an amount corresponding to one symbol.

4. The optical receiver according to claim 1, wherein the input light splitting portion, the first light splitting portion, and the second light splitting portion each comprise a half beam splitter, and wherein the input light splitting portion is located between the second light splitting portion and an optical path of light that is reflected by the first reflecting portion and travels straight through the first light splitting portion, and between the first light splitting portion and an optical path of light that is reflected by the third reflecting portion and travels straight through the second light splitting portion.

5. The optical receiver according to claim 1, further comprising an input light reflective mirror for reflecting the modulated light input from an optical fiber toward the input light splitting portion, wherein an optical path of the modulated light input from the optical fiber and an optical path of light reflected by the input light reflective mirror form an angle of 43° to 47°.

6. The optical receiver according to claim 1, further comprising a first interference light reflecting portion, a second interference light reflecting portion, a third interference light reflecting portion, and a fourth interference light reflecting portion, wherein the first light splitting portion outputs first interference light and second interference light based on the first light that is reflected by the first reflecting portion to enter the first light splitting portion and the second light that is reflected by the second reflecting portion to enter the first light splitting portion, wherein the second light splitting portion outputs third interference light and fourth interference light based on the third light that is reflected by the third reflecting portion to enter the second light splitting portion and the fourth light that is reflected by the fourth reflecting portion to enter the second light splitting portion, and wherein the first interference light reflecting portion, the second interference light reflecting portion, the third interference light reflecting portion, and the fourth interference light reflecting portion reflect the first interference light, the second interference light, the third interference light, and the fourth interference light, respectively.

7. The optical receiver according to claim 6, wherein an optical path of the second interference light from the first light splitting portion to the second interference light reflecting portion intersects with an optical path of the third interference light from the second light splitting portion to the third interference light reflecting portion.

8. The optical receiver according to claim 6, wherein the first interference light reflecting portion, the second interference light reflecting portion, the third interference light reflecting portion, and the fourth interference light reflecting portion each have a trapezoidal shape in section, and wherein the first interference light reflecting portion, the second interference light reflecting portion, the third interference light reflecting portion, and the fourth interference light reflecting portion are arranged so that the first interference light, the second interference light, the third interference light, and the fourth interference light each enter a surface including one of non-parallel opposite sides of the trapezoidal shape and are each reflected by a surface including a longer side of parallel opposite sides of the trapezoidal shape.

9. The optical receiver according to claim 6, further comprising:

a first light receiving portion for receiving the first interference light reflected by the first interference light reflecting portion and the second interference light reflected by the second interference light reflecting portion; and a second light receiving portion for receiving the third interference light reflected by the third interference light reflecting portion and the fourth interference light reflected by the fourth interference light reflecting portion, wherein the first light splitting portion is present on a bisector of an angle between an optical path of the first interference light reflected by the first interference light reflecting portion and an optical path of the second interference light reflected by the second interference light reflecting portion, and wherein the second light splitting portion is present on a bisector of an angle between an optical path of the third interference light reflected by the third interference light reflecting portion and an optical path of the fourth interference light reflected by the fourth interference light reflecting portion.

10. The optical receiver according to claim 1, further comprising:

a main substrate onto which the input light splitting portion, the first delay interferometer, and the second delay interferometer are mounted; and a case configured to house the main substrate.

11. The optical receiver according to claim 10, wherein the input light splitting portion, the first light splitting portion, and the second light splitting portion each comprise a half beam splitter.

12. The optical receiver according to claim 11, wherein the half beam splitter has a splitting film surface that is substantially parallel to a longitudinal side of the case.

13. The optical receiver according to claim 11, wherein the half beam splitter has a reflecting and splitting surface that is tilted by 1° to 8° with respect to a longitudinal side of the case.

14. The optical receiver according to claim 11, wherein the main substrate has a longitudinal side that is substantially parallel to a longitudinal side of the case.

15. The optical receiver according to claim 12, wherein an angle formed by the splitting film surface of the half beam splitter, which being the input light splitting portion, and the modulated light comprises an angle of one of 37° to 44° and 46° to 53°.

* * * * *